(12) United States Patent
Deshpande

(10) Patent No.: US 8,301,717 B2
(45) Date of Patent: Oct. 30, 2012

(54) EXTENDED VIRTUAL MEMORY SYSTEM AND METHOD IN A COMPUTER CLUSTER

(75) Inventor: Bhalchandra Dattatray Deshpande, Cupertino, CA (US)

(73) Assignee: Deshpande Enterprises, Inc., Cupertino, CA (US)

( * ) Notice: Subject to any disclaimer, the term of this patent is extended or adjusted under 35 U.S.C. 154(b) by 360 days.

(21) Appl. No.: 12/480,896

(22) Filed: Jun. 9, 2009

(65) Prior Publication Data

US 2010/0312850 A1    Dec. 9, 2010

(51) Int. Cl.
*G06F 15/167* (2006.01)
(52) U.S. Cl. ........................................................ 709/216
(58) Field of Classification Search .................... 709/216
See application file for complete search history.

(56) References Cited

U.S. PATENT DOCUMENTS

| | | | | |
|---|---|---|---|---|
| 5,860,146 | A * | 1/1999 | Vishin et al. ................. | 711/207 |
| 6,047,323 | A * | 4/2000 | Krause .......................... | 709/227 |
| 6,049,853 | A * | 4/2000 | Kingsbury et al. ........... | 711/147 |
| 6,496,909 | B1 * | 12/2002 | Schimmel ...................... | 711/163 |
| 6,701,421 | B1 * | 3/2004 | Elnozahy et al. ............. | 711/170 |
| 7,409,525 | B1 * | 8/2008 | Clark et al. ................... | 711/206 |
| 7,519,771 | B1 * | 4/2009 | Faanes et al. ................. | 711/118 |
| 7,756,943 | B1 * | 7/2010 | Wong ............................ | 709/212 |
| 8,131,814 | B1 * | 3/2012 | Schlansker et al. ........... | 709/212 |
| 2002/0078271 | A1 * | 6/2002 | Berry ............................. | 710/36 |
| 2002/0133594 | A1 * | 9/2002 | Syvanne ....................... | 709/226 |
| 2002/0161848 | A1 * | 10/2002 | Willman et al. .............. | 709/213 |
| 2002/0172199 | A1 * | 11/2002 | Scott et al. .................... | 370/389 |
| 2003/0163647 | A1 * | 8/2003 | Cameron et al. .............. | 711/138 |
| 2004/0015622 | A1 * | 1/2004 | Avery ............................ | 710/22 |
| 2004/0037319 | A1 * | 2/2004 | Pandya ......................... | 370/469 |
| 2006/0041733 | A1 * | 2/2006 | Hyser ............................ | 711/203 |
| 2006/0047771 | A1 * | 3/2006 | Blackmore et al. ........... | 709/209 |
| 2009/0320042 | A1 * | 12/2009 | Thelen et al. ................. | 719/312 |
| 2010/0094948 | A1 * | 4/2010 | Ganesh et al. ................ | 709/212 |

* cited by examiner

*Primary Examiner* — Imad Hussain
(74) *Attorney, Agent, or Firm* — Raj Abhyanker, P.C.

(57) ABSTRACT

Several methods and a system of an extended virtual memory system in a computer cluster are disclosed. In one aspect, a method of computer network is disclosed. The method of a computer network includes generating a virtual address space associated with a data of a local computer, translating the virtual address space to a local physical address space with a page table entry of the local computer, and declaring, with a remote memory management module of a remote computer, a set of remote kernel data structures to a local memory management module. The method also includes translating the virtual address space to a remote address of a remote memory with the local memory management module. The method may also include communicating a piece of data to the remote memory management module according to a protocol. The piece of data may be any data available on the remote computer.

20 Claims, 14 Drawing Sheets

EXTENDED VIRTUAL MEMORY SYSTEM AND METHOD IN A COMPUTER CLUSTER

FIELD OF TECHNOLOGY

This disclosure relates generally to fields of computer memory management, and, more particularly, to an extended virtual memory system and method in a computer cluster.

BACKGROUND

Computer systems may include a concept of virtual memory where the processes, program instructions, and/or data reside and/or operate in a memory that is virtual (e.g., a memory created by using a non-volatile storage device to simulate additional random-access memory). The allocation and/or mapping of virtual memory address to actual physical memory address can be performed by the operating system at run time.

When operating in virtual memory mode, programmers may not need to be aware of the amount of physical memory in a computer. Furthermore, programmers may not need to be aware of the exact location of physical memory that they might use. Due to hardware limitations, the physical memory that can be used by the virtual address space (e.g., virtual memory) of a computer program has been limited to the physical boundaries of the computer system. This limitation becomes a serious problem when it is required to combine and/or cluster resources of various physically separate computer systems without making modifications to user programs because user programs operate in virtual address space that can utilize only the physical memory available on that computer. The same issue may also prevent operating systems and their kernel component on each computer to seamlessly share useful resources at an operating system level (e.g., file system cache, idle processors, I/O devices etc.)

SUMMARY

Several methods and system of an extended virtual memory system are disclosed. In one aspect, a method of a computer network is disclosed. The method includes generating a virtual address space associated with a data of a remote computer. In addition, the method includes translating the virtual address space to a local physical address with a page table entry of the local computer. The method also includes declaring, with a remote memory management module of a remote computer, a set of remote kernel data structures to a local memory management module. The method also includes translating the virtual address space to a remote address of a remote memory with the local memory management module.

The method may include communicating a piece of data to the remote memory management module according to a protocol. The piece of data may be any data available on the local computer. The protocol may be based on a mutually negotiated agreement between the remote computer and the local computer. The method may include storing the piece of data on the remote computer through the remote memory management module.

The declaration of the set of remote kernel data structures of the remote computer may include declaring the remote kernel data structures as including a remote physical address or a remote virtual address (e.g., the remote virtual address may include a kernel data structure) to the local memory management module. Furthermore, the declaration may include declaring the list of free remote physical memory to the local memory management module. The method may include mapping the remote virtual address to the local virtual address.

The method may communicate a kernel data structure lock from the remote computer to a local lock management module of the local computer to enable modification of the piece of data. In addition, the method may include requesting a remote lock management module to perform an acquisition of a lock on the remote computer. Also, a release of the remote lock on the remote computer may be requested based on a decision of the local computer.

A cache of a disk storage device may be created in the local physical memory. An additional virtual address space associated with an additional data stored in the disk storage device on the remote computer may be generated. In addition, the additional virtual address space may be translated to an additional remote physical address of the remote memory using the local and/or remote memory management module.

Another virtual address space associated with a device instruction data of the local computer may also be generated. The other virtual address space may be translated to the local physical address space with a page table entry of the local computer. A translation of the other virtual address space to the remote virtual address of the remote computer may be performed with the remote memory management module. The virtual addresses may be process specific. In addition, the virtual addresses may belong to a kernel mode or a user mode. The device instruction data may be communicated from the local computer to the remote memory management module. In addition, the device instruction data may be stored to a device control register of the remote memory.

In another aspect, a system of computer networking is disclosed. The system includes a local memory management module of a local computer. In addition, the system includes a remote computer coupled to the local computer through a computer network. The system also includes a virtual address module of the local memory management module to generate a kernel virtual address space associated with a set of kernel data of the local computer. The system includes a translation module of the local memory management module to translate the virtual address space to a local physical address with a page table entry of the local computer. The system further includes a remote memory management module of the remote computer to declare a set of remote kernel data structures to the local memory management module.

The system may include a local lock memory management module. In addition, the remote computer system may include a remote lock management module to export a kernel data structure lock to the local lock management module of the local computer. The system may include a device control module to provide instructions to a device control register of the remote physical memory. The data may include a device instruction data.

In yet another aspect, a local computer method is disclosed. The method includes acquiring a list of free remote physical memory of another computer of a computer cluster. In addition, the method includes translating a virtual address space of the local computer comprising the computer to a remote physical address of a remote memory of the other computer through the remote memory management module. The method also includes transferring a page of a local physical memory of the local computer to the remote physical address of the other computer using a computer network.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which.

Figure 9A:
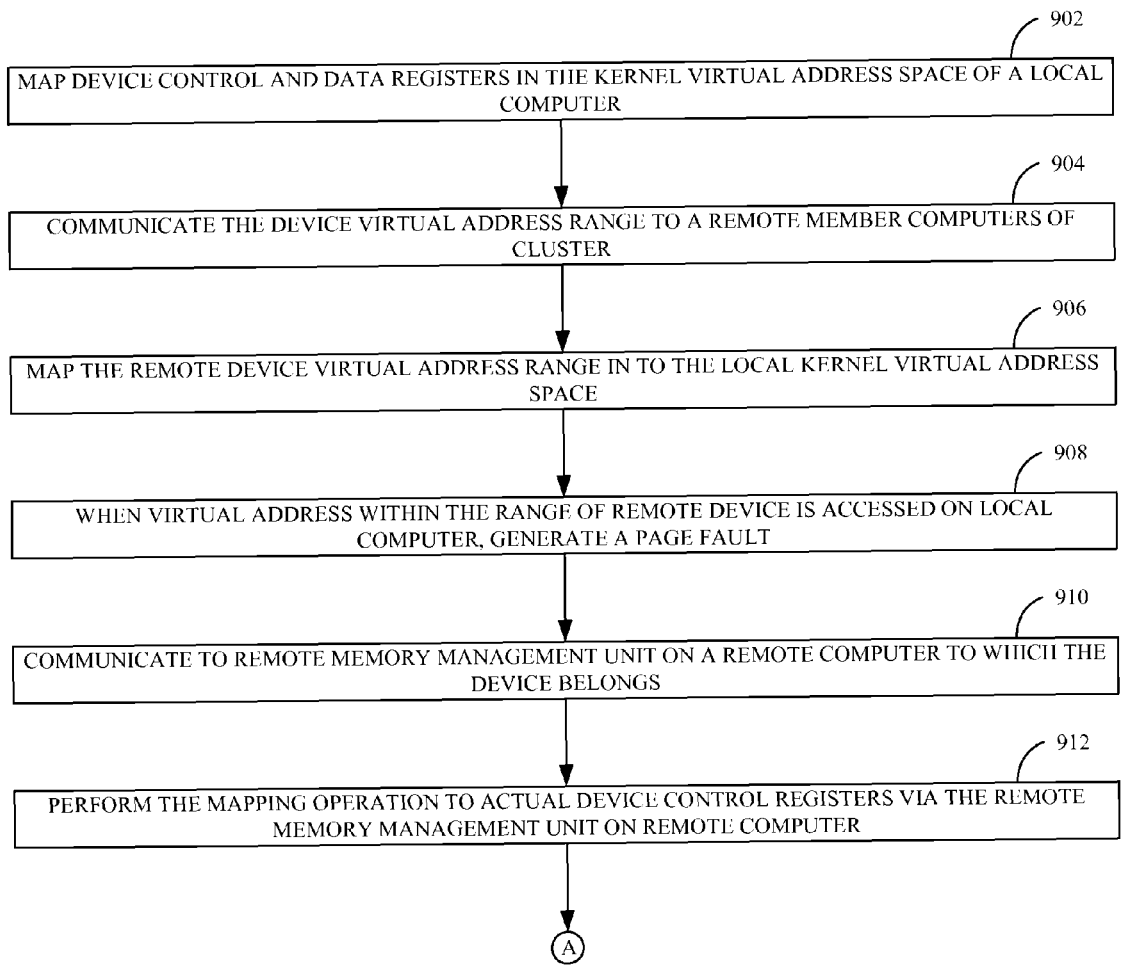
Figure 9B:
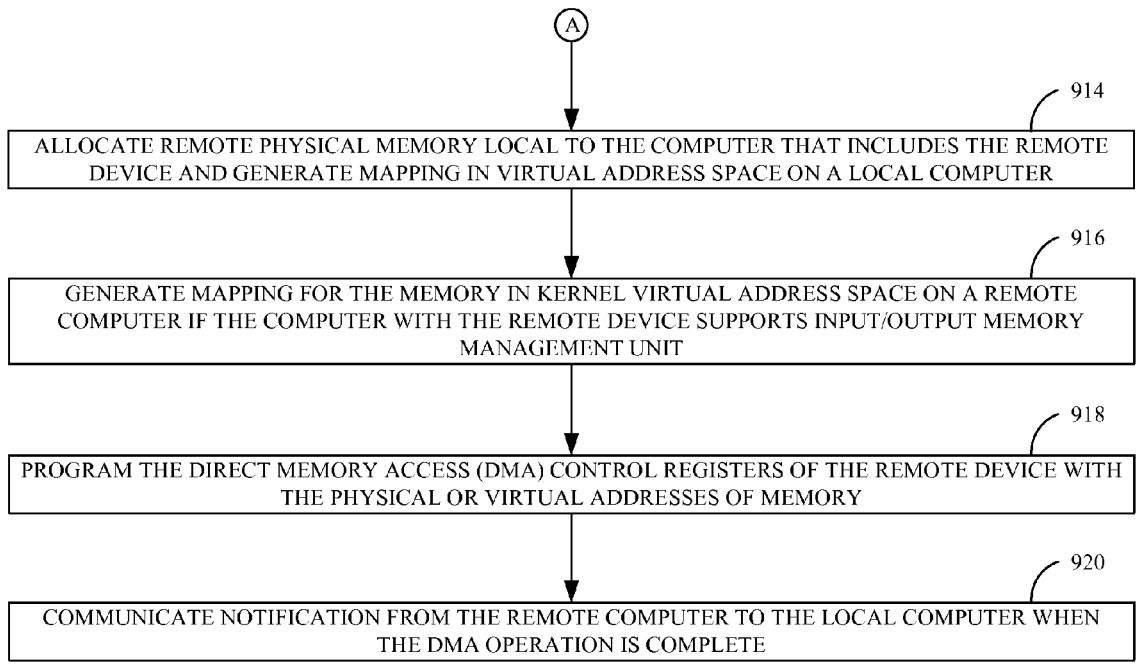

FIG. 9A-B illustrates a process flow of data transfer or I/O operation performed from a local computer using a remote device on the remote computer, according to one embodiment.

FIG. 9A illustrates a process flow of programming the control registers of the remote device of the remote computer by the local computer in the computer cluster, according to one or more embodiments.

FIG. 9B is a continuation of process flow of FIG. 9A, illustrating performance data I/O operation using the remote devices of the remote computer continued from programming the control registers of the remote device, from FIG. 9A, according to one or more embodiments.

Figure 10:
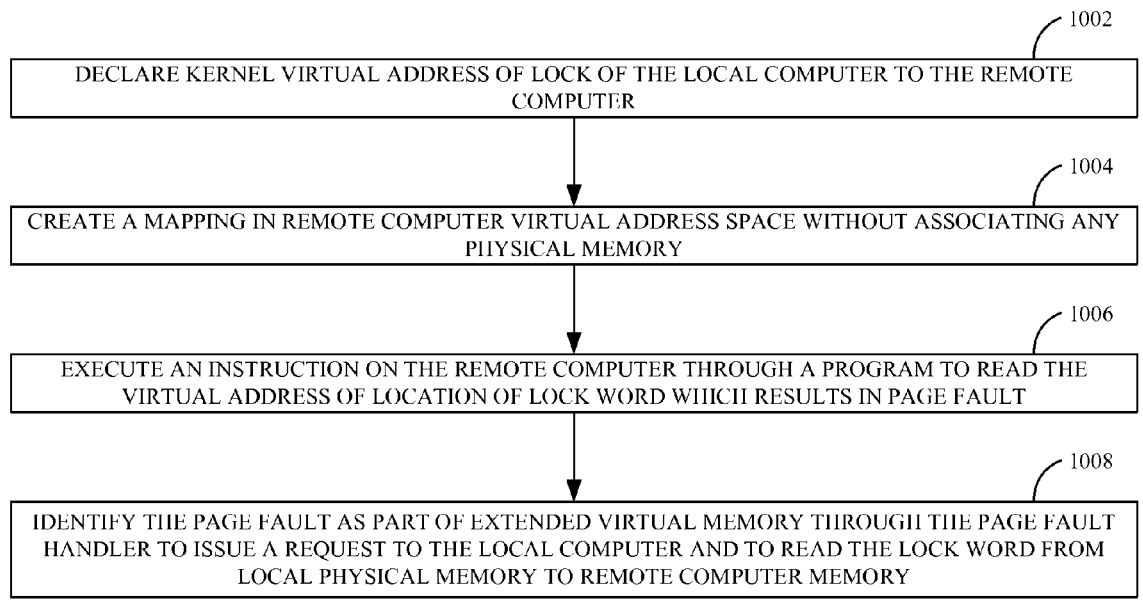

FIG. 10 is a process flow of reading a lock word from the remote computer to a local computer, according to one embodiment.

Figure 11:
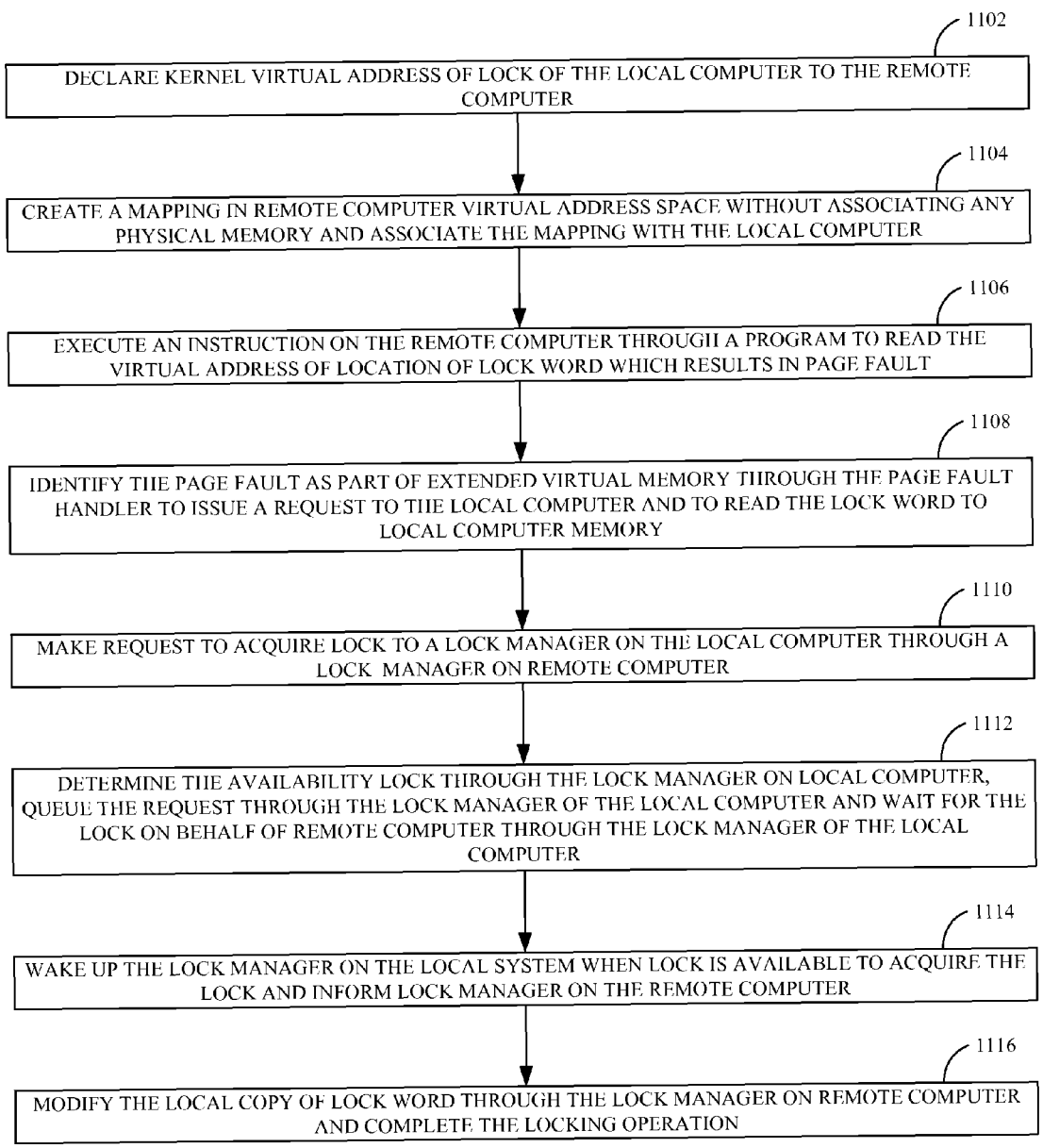

FIG. 11 is a process flow of obtaining a remote lock, according to one embodiment.

Figure 12:
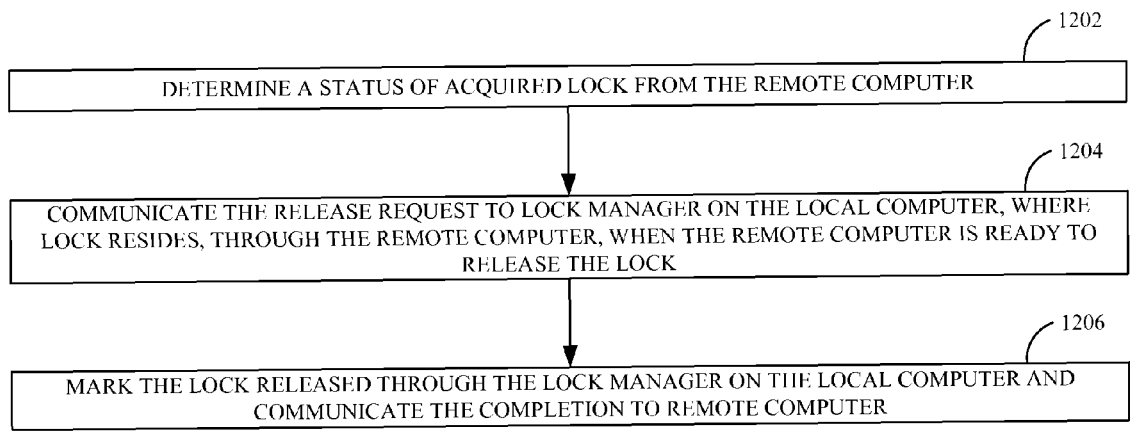

FIG. 12 is a process flow illustrating lock release operation, according to one embodiment.

Other features of the present embodiments will be apparent from the accompanying drawings and from the detailed description that follows.

DETAILED DESCRIPTION

Several methods and a system of an extended virtual memory in a computer cluster are disclosed. Although the present embodiments have been described with reference to specific example embodiments, it will be evident that various modifications and changes may be made to these embodiments without departing from the broader spirit and scope of the various embodiments.

Figure 1:
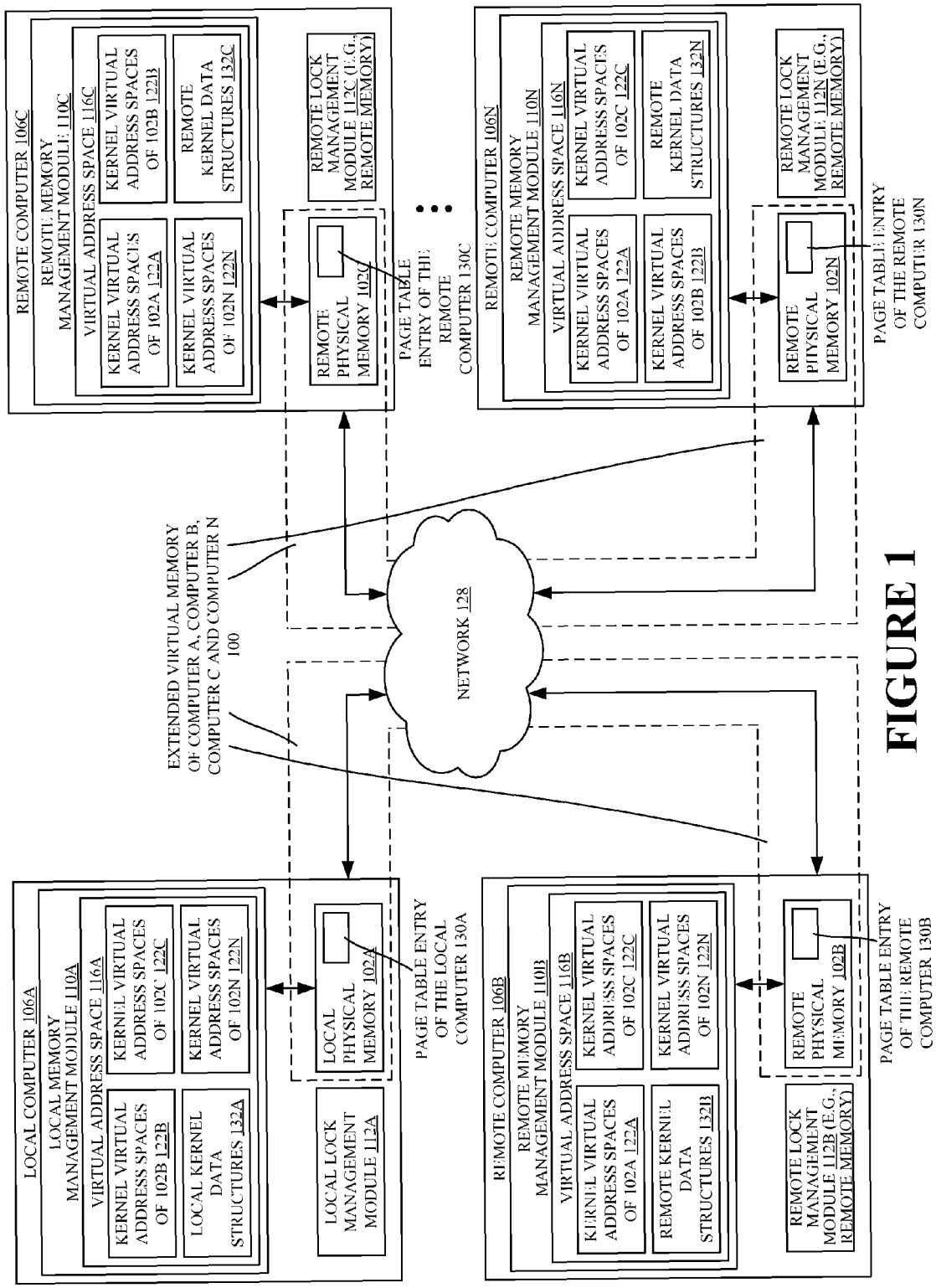
FIG. 1 is a block system view illustrating an extended virtual memory of the members of a computer cluster, according to one or more embodiments.

FIG. 1 is a block system view illustrating the extended virtual memory of the members of a computer cluster, according to one or more embodiments. Particularly, FIG. 1 illustrates the computer cluster comprising computers 106A-N communicatively coupled to each other through a network 128. Each of the computers 106A-N in the computer cluster includes, inter alia, a memory management module 110, a virtual address space 116, a lock management module 112, and a physical memory 102. The network 128 may enable communication between the computers 106A-N.

FIG. 1 particularly illustrates an extended virtual memory 100 of the computers 106A-N, according to an embodiment. In an embodiment, the extended virtual memory 100 of the computers 106A-N may be a group of the physical memories of individual computer networked in such a way that a part of physical memory of every computer is allotted for global usage without even having global memory management module in the computer cluster. In an example, the local virtual memory for the computer 106A includes the local physical memory 102A that is local to the computer 106A and the remote physical memories 102B-N of the other computers 106B-N (e.g., through the extended virtual network) in the computer cluster. The operating system of the computer 106A may include a local memory management module 110A and a local lock management module 112A. The local memory management module 110A includes a virtual address space 116A and the local physical memory 102A. The virtual address space 116A may include mapped kernel virtual address spaces of the remote physical memories 102B-N, a local kernel data structure 132A and a user virtual address space. The virtual address space 116 may also include a local/remote kernel data structure 132. The local physical memory 102A may include a page table entry of the local computer 130A. A page table may be data structure used by an operating system to store mapping information associated with the virtual addresses and physical addresses. The page table entry may be an entry in the data structure that maps virtual addresses to the physical addresses.

Additionally, as shown in FIG. 1, the virtual address space 116A incorporates mappings of kernel virtual address spaces 122A-N. The local lock management module 112A is an application used by the operating system to synchronize operations on shared resources, such as critical sections and devices, by more than one concurrent application. All other computers in the cluster may have similar structures.

In the example embodiment, the local physical memory 102A-N is a form of memory directly accessible by a processor of the computer 106. For example, the physical memory 102A-N may be a random access memory or a direct random access memory. The local/remote memory management module 110A-N is a software functionality that manages the memory resources of the computer 106A-N. In one embodiment, the local/remote memory management module 110A-N may request and utilize the physical memories of the other computers.

Figure 4:
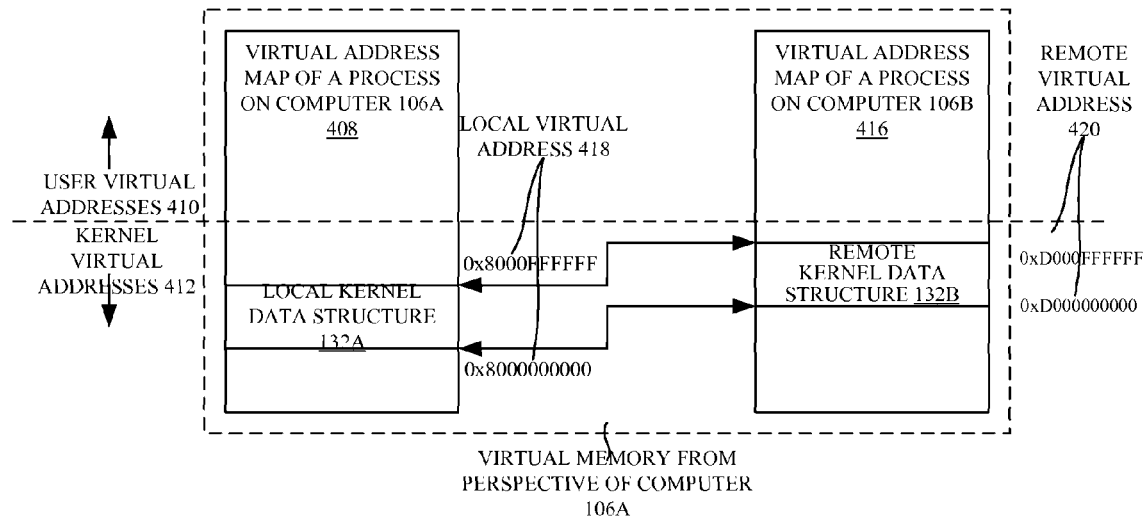
FIG. 4 is a systematic view illustrating a mapping of kernel data structures of local virtual address spaces of a local computer to remote virtual address spaces of another computer, according to one embodiment.

The virtual address space 116A is a collection of contiguous memory addresses of a process (or an application) on the local computer 106A. Computer software running on the computer 106A addresses memory using the continuous memory address. As illustrated in FIG. 4, the virtual address space on each computer is divided into two sections: user virtual addresses 410 and kernel virtual addresses 412. The user virtual addresses 410 are used by an application program or a process being executed in a user mode. The kernel virtual addresses 412 may be used by an application or processes that are executed in kernel or privileged system mode. The user virtual address 410 mappings are unique to a particular process, while the kernel virtual address space 122 mappings are same or common for all processes in a system.

In an embodiment, the local memory management module 110A performs the following tasks: (a) enabling the use of some portion of local free physical memory to other systems and to perform data read/write; (b) enabling the access to local physical memory that is part of kernel virtual data from a remote system; (c) enabling the local computer 106A to use free physical memory on the remote computers 106B-N; and (d) enabling the local computer 106A to access the remote physical memory 102B-N that is part of kernel virtual data on the remote computers 106B-N, and hence map the virtual kernel address spaces of the remote computers 106B-N in the kernel virtual address space 122. The local memory management module 110A may translate the continuous addresses into the actual physical addresses of the physical memory 102A-N.

Figure 2:
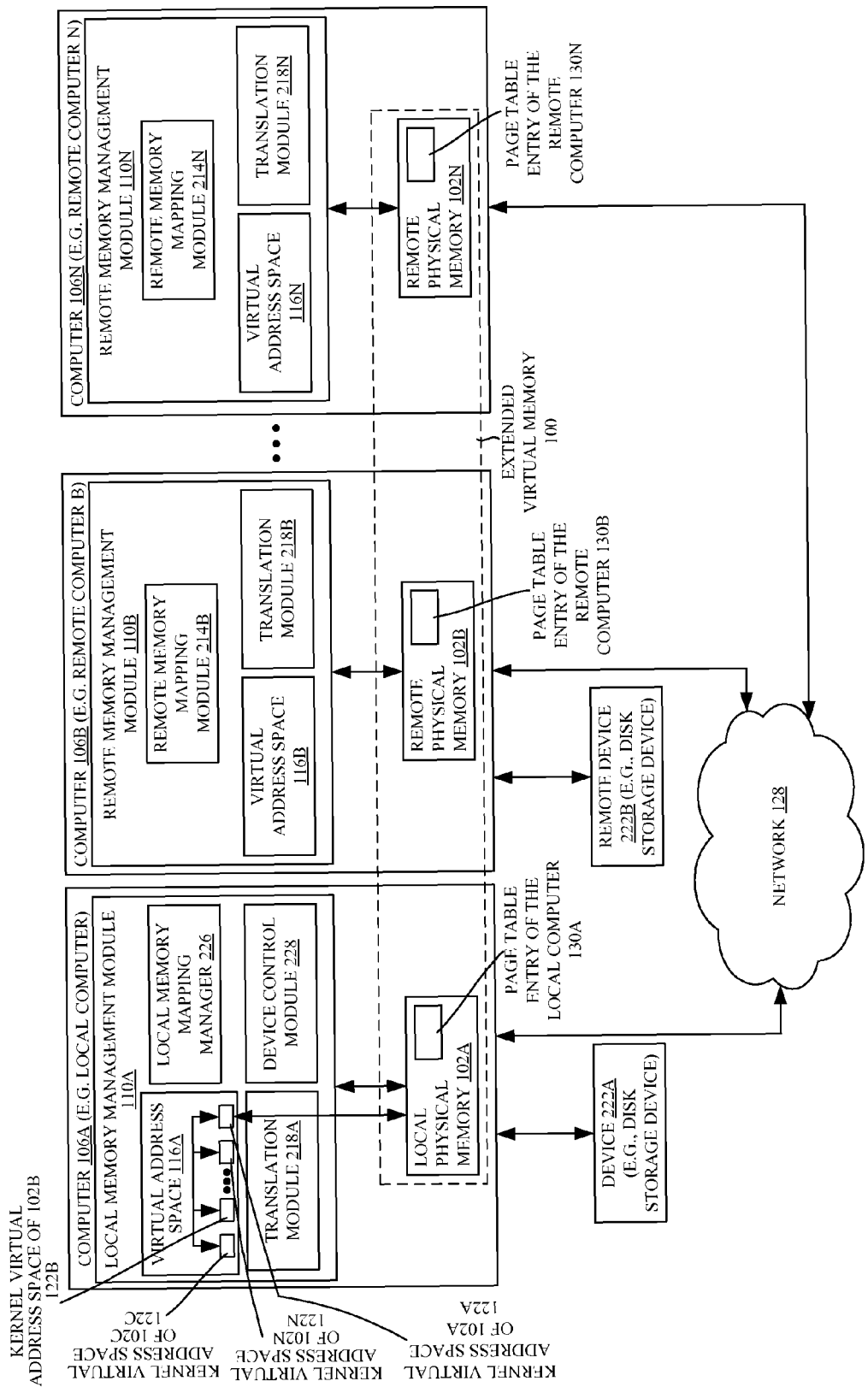
FIG. 2 is a block system view illustrating the extended virtual memory for a particular computer in the computer cluster, according to one embodiment.

FIG. 2 is a block system view illustrating the extended virtual memory for a particular computer in the computer cluster, according to one embodiment. Particularly, FIG. 2 illustrates the computer cluster comprising the local computer 106A and the remote computers 106B-106N communicatively coupled to each other through the network 128. The extended virtual memory 100 may be generated by communicatively coupling the physical memories 102A-N of all the computers 106A-N through the network 128. The local computer 106A includes, inter alia, the local memory management module 110A and the local physical memory 102A. The local memory management module 110A includes a virtual address space 116A, a local memory mapping manager 226, a translation module 218A, and a device control module 228. The local memory mapping manager 226 may enable mapping of remote request for memory from a remote computer to a physical memory. The remote memory mapping manager 214B-N may be same as the local memory mapping manager. The translation module 218 of the local memory management module 110A may translate the continuous addresses into the actual physical addresses of the local physical memory 102A. Furthermore, the translation module 218 may translate the virtual address space 116 to the local physical address through a page table entry of the local computer 106A. The device control module 228 may be a software application that manages the activities of the devices in the local computer 106A. The requests for the local memory resources may be received from any of the remote computers 106B-N through the remote memory management modules 110B-N of the respective remote computers 106B-N. The request for the memory resources may also be received from the local computer 106A. The page table may include all the address information required for mapping between virtual and physical address. Every physical memory 102A-N may include the page table entry 130A-N managed by the operating system.

Figure 3A:
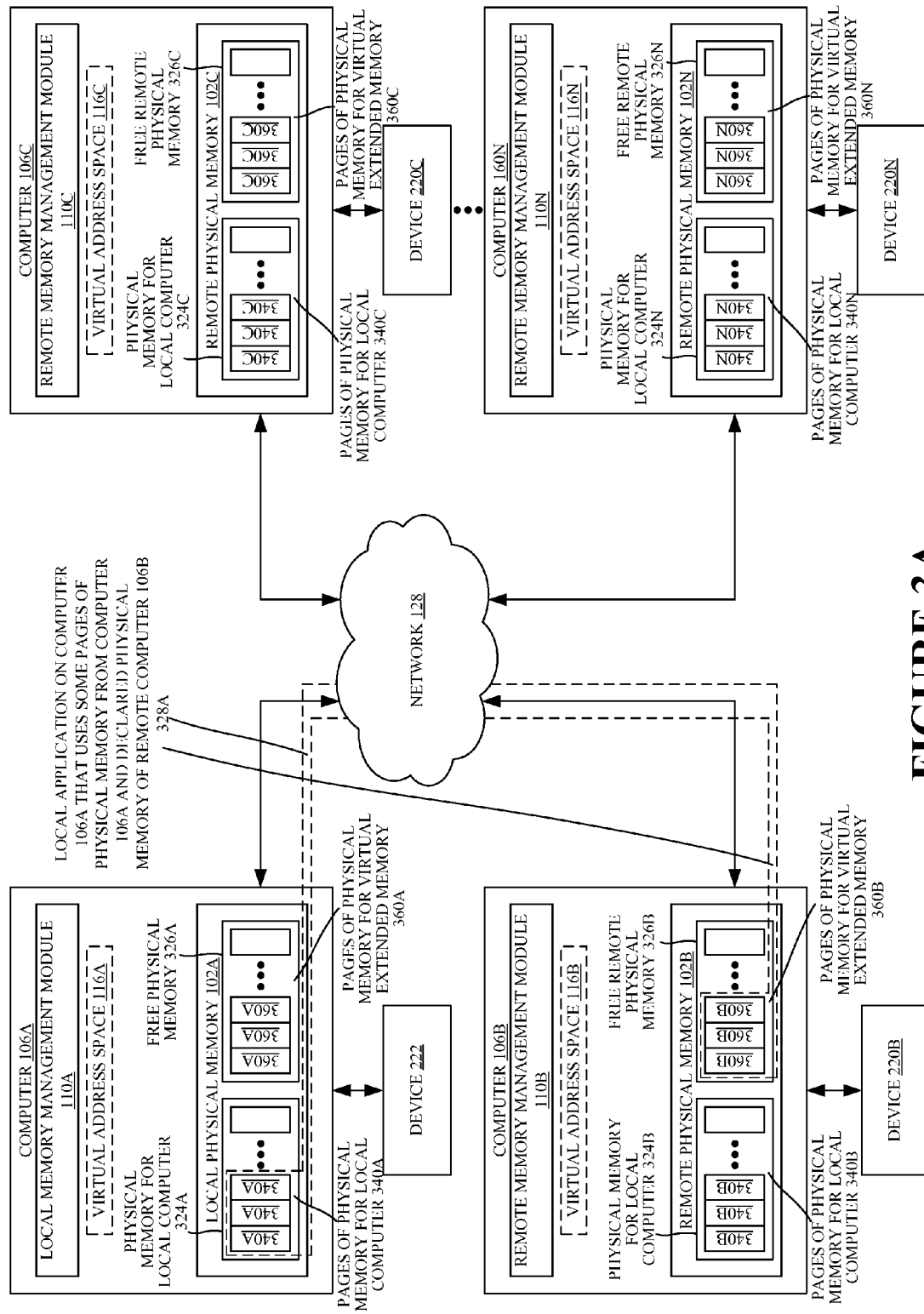
FIG. 3A is a systematic view illustrating an example of usage of the extended virtual memory, according to one embodiment.
Figure 3B:
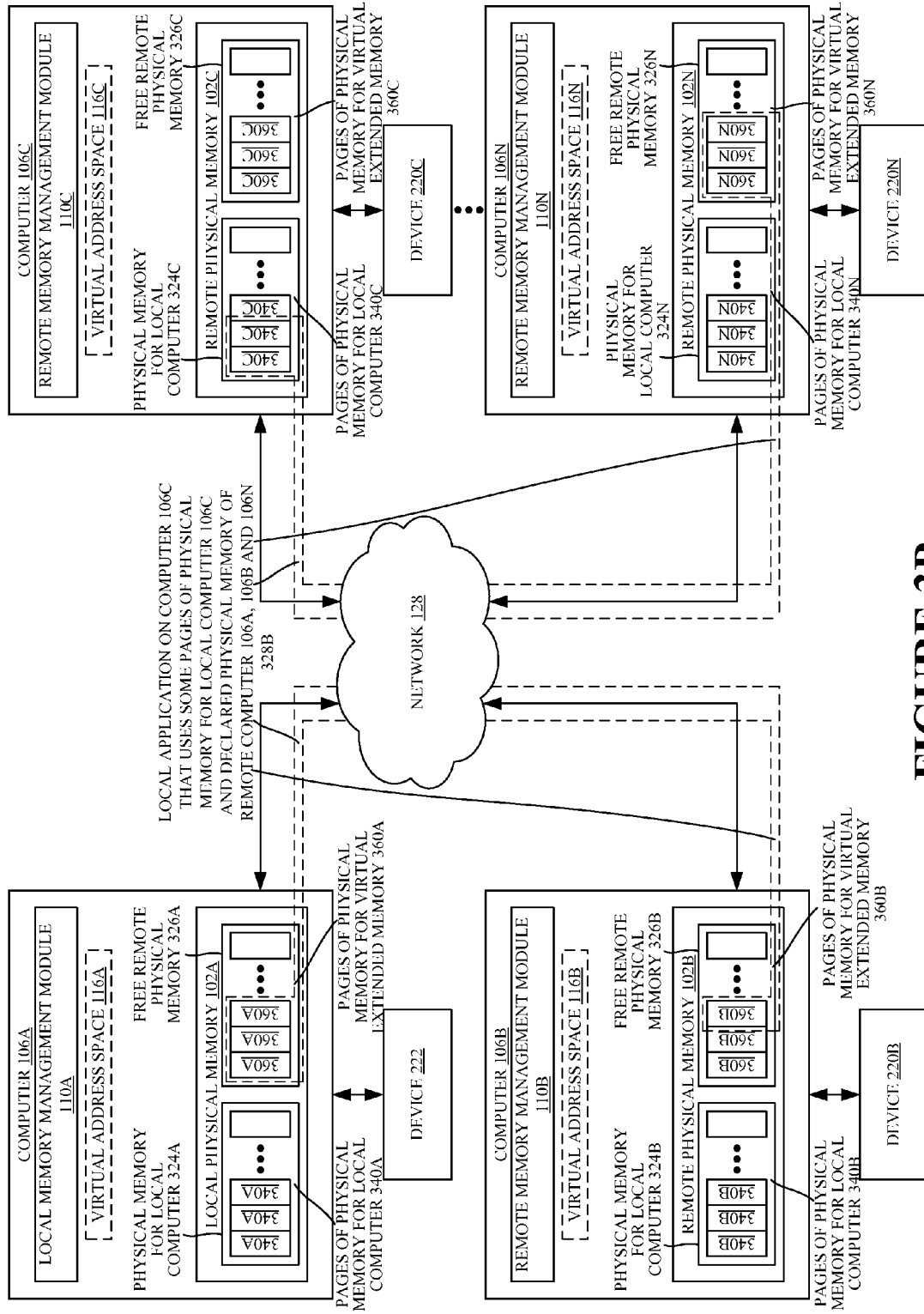
FIG. 3B is another example that illustrates an application (or a process) on a computer that uses the extended virtual memory that includes pages of declared physical memories of various computers.

The local memory management module 110A may manage the virtual address space 116A. The extended virtual memory 100 may include a local physical memory 102A and remote physical memories 102B-N. The remote physical memories 102B-N may be the part of remote physical memories 102B-N that are declared as free (e.g., free remote physical memory 326 as illustrated in FIG. 3A-B) by the remote computers 106B-N. Each of the computer 106A-N in the computer cluster may have local kernel virtual address space and virtual kernel address spaces of other remote computers in the network 128. For example, the computer 106A may include the virtual kernel address space of the computer 106A and parts of kernel virtual address spaces 122B-N of the other remote computers 106B-N respectively.

Additionally, each of the computers may have a provision to include more devices. The device in the example embodiment may be a disk storage device. For example, a device 222A is connected to the computer 106A and a remote device 222B is connected to the remote computer 106B. The device of each computer may require control of access which is provided by the device control module 228. The device 222A may be controlled by the device control module 228. Similarly, the remote device 222B may be controlled by a device control module (not illustrated in the Figure) of the remote computer 106B. The device control module 228 may provide instructions to a device control register of the remote physical memory 102B. The device instruction data may be stored to the device control register of the remote physical memory 102B. The illustration is only exemplary and since all the computers in the cluster may be identical, the remote device control module is not illustrated in the remote computers 106B-N for simplicity of the figure.

FIG. 3A is a systematic view illustrating an example of usage of an extended virtual memory, according to one embodiment. In an embodiment, the local physical memory 102A of the computer 106A may be divided into two sections. The two sections may include a physical memory for local computer 324A and a free physical memory for the use of remote computers 326A. The physical memory for local computer 324A may be divided into pages 340A. The page may be a fixed-length block of memory that is used as a unit of transfer between physical memory and storage device such as disk. The free physical memory for the use of remote computers 326A may also be divided into pages 360A. Similarly, the other computer memories may also be divided into pages physical memory for local computer use 340B-N and pages of physical memory for virtual extended memory 360B-N. An application (or a process) that is executed on computer 106A may use the virtual address space 116A. As a result, the application (or the process) may use pages of physical memory for local computer 340A.

In an example embodiment, when the application (or the process) requires extra space, the local memory management module 110A may request the remote memory management module 110B of the remote computer 106B for making use of free remote physical memory 326B. The remote memory management module 110B may enable the usage of memory for the application (or the process) being executed in the local computer 106A. The address mapping process to enable making use of the remote physical memory in the extended virtual memory may be better understood from FIG. 4. The application (or the process) then utilizes pages from the free remote physical memory 326B declared by the remote computer 106B.

In an example embodiment, data may be communicated between the memory management modules 110 of the computers 106A-N based on a protocol. In an embodiment, the protocol may be based on mutually negotiated agreement between the remote computer and the local computer. The application (or the process) can use different number of pages from different computers as needed at the time of running the application (or the process). In an example embodiment, an application (or a process) 328A on the computer 106A is illustrated using pages of the physical memory for local computer 340A and the pages from free remote physical memory 360B of the computer 106B. The computers in the cluster may run any number of applications (or processes) at any given time. These applications (or processes) may use as much remote memory and remote devices as needed up to the availability of the extended virtual memory.

In an example embodiment, the application being executed on the local computer 106A may require more memory. The local memory management module 110A may communicate with the remote memory management module 110B for additional space. Furthermore, the remote memory management module 110B may enable the access to the local memory management module 110. The communication process may initiate when the application requires more space. The application may try to access the virtual memory location that is mapped to the remote computer 106B through the extended virtual memory 328A. The extended virtual memory 328 may throw a page fault in case where physical memory is not loaded. The page fault may be handled by the page fault handler (e.g., not shown in Figure) of the local memory management module 110A. The local memory management module 110A may refer the page fault to the remote memory management module on remote computer 110B to load the physical memory. Furthermore, the translation module 218B may translate the request of the local memory management module 110A to map it in to actual remote physical memory 102B. As the mapping is completed and access is given to the application, the application makes use of the extended virtual memory 328A. The process of mapping may be better understood through FIG. 8.

FIG. 3B is another example that illustrates an application (or a process) 328B on the computer 106C using the extended virtual memory 328B that includes pages of declared physical memories of various computers. Similar to the process as illustrated in FIG. 3A, the application (or the process) on the computer 106C may utilize the pages of physical memory of the computer 106C and pages of free remote physical memory 360B-N through the extended virtual memory 328B.

FIG. 4 is a systematic view illustrating a mapping of kernel data structures of local kernel virtual address space of the local computer to kernel virtual address space of the remote computer, according to one embodiment. In an embodiment the virtual address space 116 of the computers may be divided into the user virtual addresses 410 and the kernel virtual addresses 412. The virtual addresses may be process specific. The virtual address space 116 may be divided for a kernel mode and a user mode. The virtual address space 116 in the kernel mode may have an entire virtual address range for its use.

In an example embodiment, the local virtual address space of a process 408 on the computer 106A and remote virtual address spaces of process 416 on the computer 106B are divided into user virtual addresses 410 and kernel virtual addresses 412. The virtual memory from perspective of the computer 106A includes both the user virtual addresses 410 and the kernel virtual addresses 412. In an embodiment, a local virtual address 418 ranging from 0X8000FFFFFF to 0X8000000000 may be mapped into range 0XD000FFFFFF to 0XD000000000 in the remote virtual address 420. In other words, the local kernel data structure 132A may be mapped into the remote kernel data structure 132B or vice versa. In case of user applications (or processes), the user applications exclusively own their respective virtual address spaces in 410. Therefore, the user applications in the computers 106A and 106B can use pages in their computers 106A and 106B respectively without any mapping.

Figure 5:
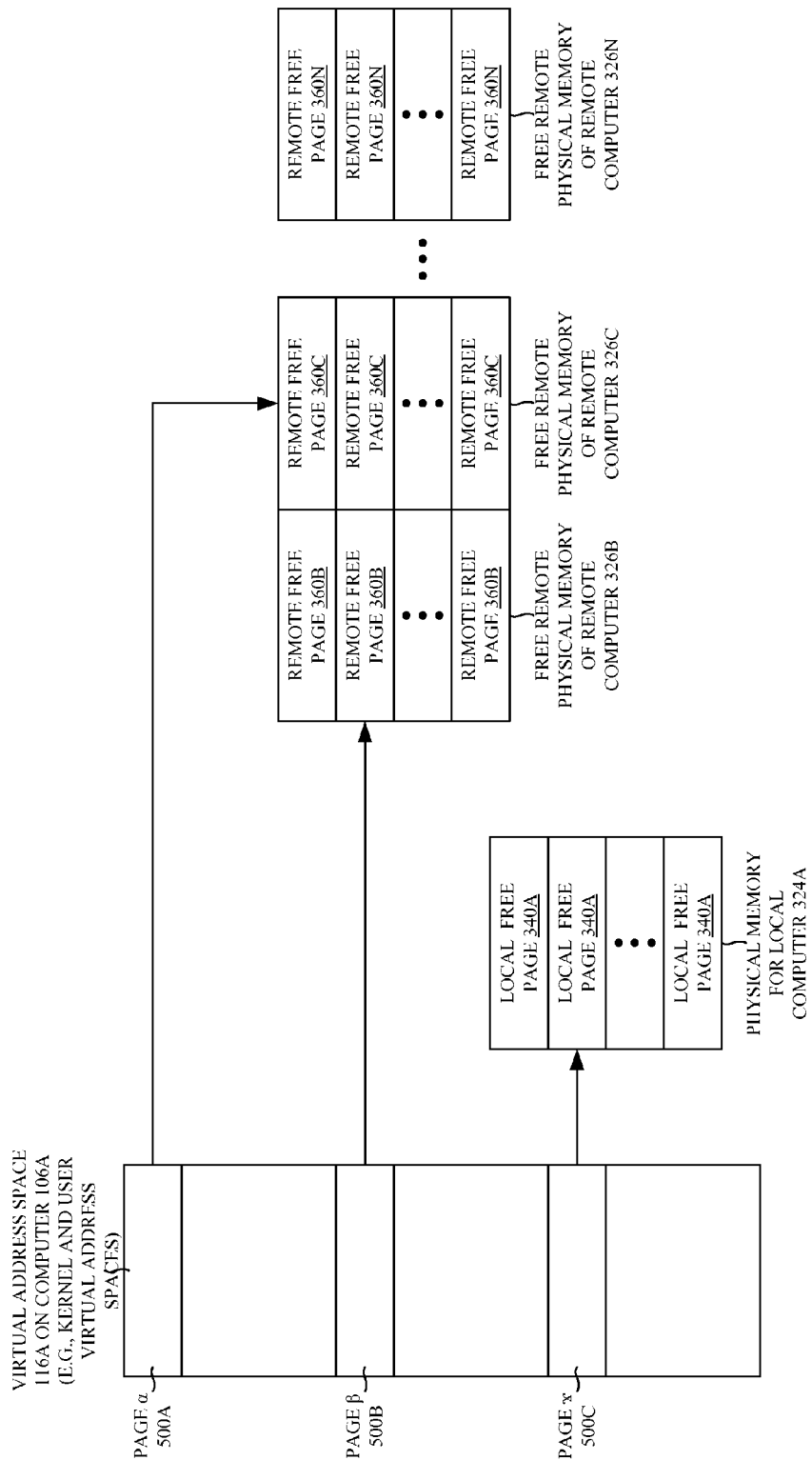
FIG. 5 illustrates a mapping scheme of process virtual address space in the extended virtual memory in a computer cluster, according to an example embodiment.

FIG. 5 is a mapping scheme illustrating extension of a virtual memory in the computer cluster, according to an example embodiment. In an example embodiment, the virtual address spaces on computer 106A are divided into pages like page α 500A, page β 500B, page γ 500C, etc. The page α 500A may be mapped to the free remote physical memory 326B of the remote computer 106B, the page β 500B may be mapped to a free remote physical memory 326C of the remote computer 106C, and the page γ 500C may be mapped to a free remote physical memory 326N of the remote computer 106N. In an embodiment, the mapping process described in FIG. 5 may be the same as mapping process described in FIG. 4, but not limiting to the description in FIG. 4.

Figure 6:
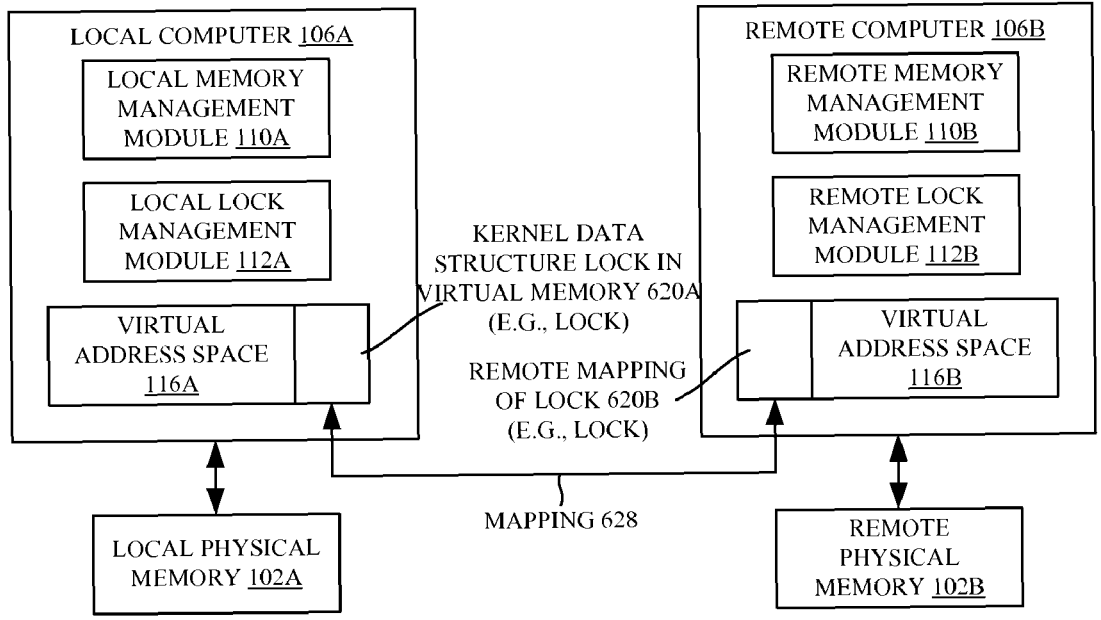
FIG. 6 is a simplified illustration of mapping kernel data structure in virtual memory of one computer to a virtual memory of another computer, according to one embodiment.

FIG. 6 shows a simplified illustration of mapping kernel data structure in a virtual memory of one computer to a virtual memory of another computer, according to one embodiment. The computers 106A and 106B are shown to be identical for illustration purposes. The computer 106A may include inter alia, the local memory management module 110A, the local lock management module 112A, the virtual address space 116A and the local physical memory 102A. The remote computer 106B may include, inter alia, the remote memory management module 110B, the remote lock management module 112B, the virtual address space 116B and the remote physical memory 102B. The mapping 628 may be a process of accessing the resources of the remote computer 106B to the local computer 106A or vice versa. The mapping operation may be performed based on the entries in the page table 130. In an embodiment, the application on the local computer 106A may require additional memory space. Therefore, the application may try to access a page that may be illustrated in the extended virtual space via the local memory management module 110A.

In an example embodiment, the extended virtual space may return a page fault. The page fault may be an interrupt to the software raised by the hardware, when a program accesses the page that is mapped in address space, but not loaded in physical memory. The page fault handler of the kernel handles the page fault by identifying the page fault as a part of extended virtual memory. The page fault handler issues a request to the remote computer 106B and enables reading a lock (e.g., kernel data structure lock) word into the memory of the local computer 106A. The loading operation may include sending a request to the local memory management module 110A of the local computer 106A by the remote memory management module 110B over the network 128, the local memory management module 110A on computer 106A accepting the request, and enabling the access to the kernel data structure for the remote computer 106B. In an example embodiment, the process of mapping 628 is implemented to enable the access of the kernel data structure of the remote computer 106B.

In an example embodiment, the lock may be a kernel data structure in virtual memory 620A. The lock may be mapped 620B into the virtual address space of the remote computer 106B. The mapping 628 of the lock may include a process of communicating from the remote computer 106B to a local lock management module 112A of the local computer 106A. The local lock management module 112A may export a kernel data structure lock to the local lock management module 112B from the local computer 106A. The local/remote lock management modules 112 may perform lock or release operations on the virtual address spaces 116.

The remote mapping of the lock 620B enables the computer 106B to access the private kernel data structure (e.g., the lock 620A) which would not have been possible in the prior art. The mapping 628 may enable sharing of kernel data structures across computers. The other advantages of this approach over the prior art includes
(a) elimination of a need for global lock manager;
(b) elimination of coding change in the parts of SMP kernel where locks are acquired and released;

(c) elimination of possible change in lock behavior in the existing operating systems that support symmetric multiprocessing system (SMP); and (d) elimination of the necessity of shared and exclusive locks as needed in typical global lock managers implemented in case of clusters used in prior art.

Figure 7:
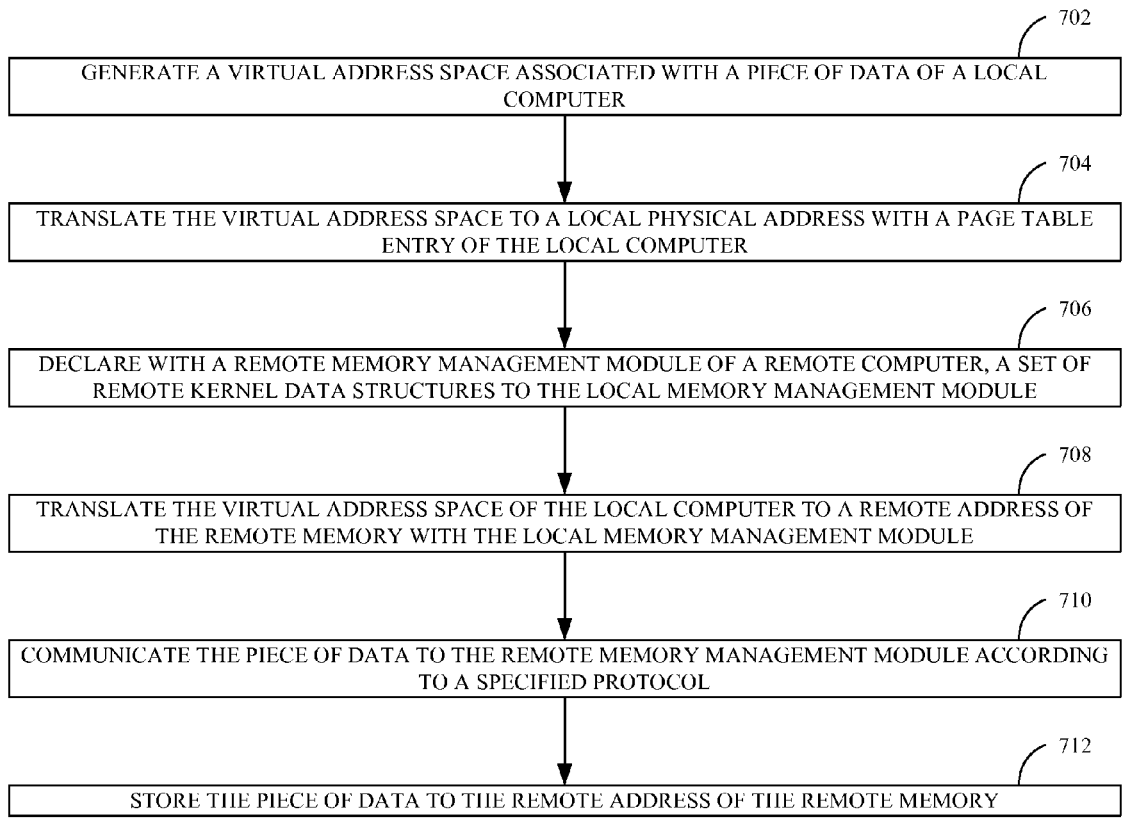
FIG. 7 is a process flow of illustrating storage of a piece of data in a virtual address space of a local computer to a remote address of a remote memory, according to one embodiment.

FIG. 7 is a process flow of illustrating storing of a piece of data in an extended virtual address space from the local computer 106A to the remote computer kernel virtual address associated with the remote physical memory 102B, according to one embodiment. In operation 702, a virtual address space associated with a piece of data of the local computer 106A may be generated. In an example embodiment, the virtual address space 116A may be generated by the virtual address module. In operation 704, the virtual address space 116A may be translated (e.g., using the translation module 218A of FIG. 2) to a local physical address space with the page table entry of the local computer 130A.

In an example embodiment, the virtual address space 116A may be translated to a remote physical address space using the translation module 218. In operation 706, a set of remote kernel data structures may be declared from the remote computer 106B to the local memory management module 110A to the remote memory management module 112B of the remote computer 106B. In operation 708, the virtual address space 116B of local computer 106A may be translated or mapped to a remote address of the remote memory through the local memory management module 112A. In operation 710, the piece of data may be communicated to the remote memory management module 110B according to a specified protocol. In operation 712, the piece of data may be stored to the remote address of the remote physical memory 102B. The above operations may be implemented using the system illustrated in FIGS. 1-6 and not limited only to the said Figures.

Figure 8:
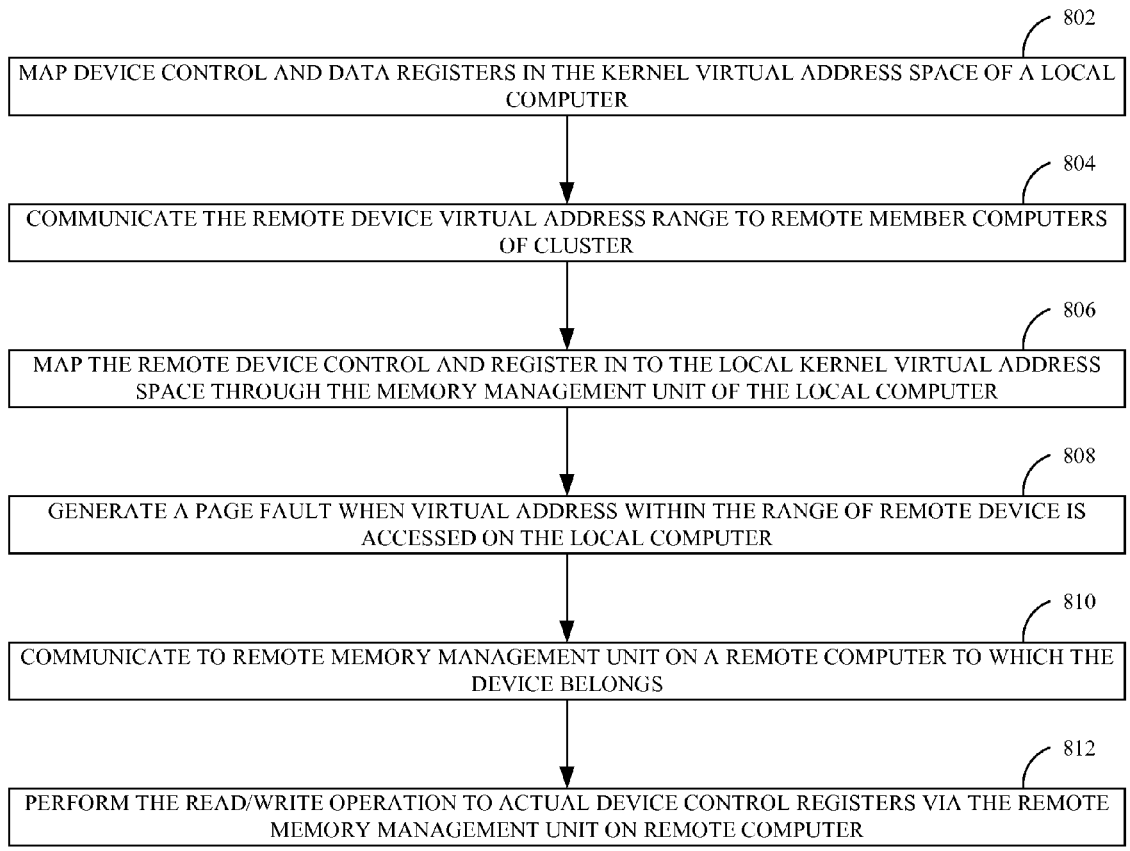
FIG. 8 is a process flow of performing a read/write operation to control register of the remote computer devices from the local computer in the network, according to one embodiment.

FIG. 8 is a process flow of managing or controlling from the local computer, a remote device on the remote computer, according to one embodiment. In operation 802, device control and data registers may be first mapped locally by the remote computer 106B in the kernel virtual address space 122B of the remote computer 106B. In operation 804, the remote device virtual address range may be communicated by the remote member computer 106B to all the member computers of cluster including the local computer 106A. In operation 806, the remote device control and data register address may be mapped by the memory management unit of the local computer 106A in to the local kernel virtual address space. In operation 808, a page fault may be generated when virtual address that is within the range the remote device is accessed on the local computer 106A. In operation 810, the remote memory management unit associated to the remote computer may be communicated by the local computer 106A. In operation 812, the read/write operation may be performed to actual device control registers by the memory management unit on the remote computer 106B. The above operations may be implemented using the system illustrated in FIGS. 2-6 and not limited, only to the said Figures.

FIG. 9A-B illustrates a process flow of data transfer or I/O transfer operation from the local computer using a remote device on the remote computer, according to one embodiment. In particular, FIG. 9A illustrates a process flow of programming the control registers of the remote device of the remote computer by the local computer in the computer cluster, according to one or more embodiments.

In operation 902, device control and data registers may be first mapped locally by the remote computer 106B in the kernel virtual address space 122B of the remote computer 106B. In operation 904, the remote device virtual address range may be communicated by the remote member computer 106B to all the member computers of cluster including the local computer 106A. In operation 906, the remote device control and data register address may be mapped by the memory management unit of the local computer 106A in to the local kernel virtual address space. In operation 908, a page fault may be generated when virtual address that is within the range the remote device is accessed on the local computer 106A. In operation 910, the remote memory management unit associated to the remote computer may be communicated by the local computer 106A. In operation 912, the read/write operation may be performed to actual device control registers by the memory management unit on the remote computer 106B.

FIG. 9B is a continuation of process flow of FIG. 9A, illustrating a data I/O operation continued from programming the control registers of the remote device using the remote devices of the remote computer, from FIG. 9A, according to one or more embodiments.

In operation 914, remote physical memory local to the computer 106B that includes the remote device may be allocated and mapping 628 may be generated in extended virtual address space on the local computer 106A. In operation 916, mapping may be generated for the memory in kernel virtual address space on the remote computer 106B if the remote computer 106B with remote device supports input/output memory management unit. In operation 918, the direct memory access control registers of remote device may be programmed with the physical or virtual address of memory. In operation 920, notification from the remote computer 106B may be communicated to the local computer 106A when the direct memory access operation is complete. The above operations may be implemented using the system illustrated in FIGS. 2-6 and not limited only to the said Figures.

FIG. 10 is a process flow of reading a lock word from the remote computer to a local computer, according to one embodiment. In operation 1002, the kernel virtual address of lock of the local computer may be declared to the remote computer 106B. In operation 1004, the mapping 628 may be generated in the remote computer 106B virtual address space 116B without associating any physical memory. In operation 1006, an instruction may be executed on the remote computer 106B by a program to read the virtual address of location of lock word to result in a page fault. In operation 1008, the page fault may be identified by the page fault handler as part of extended virtual memory to issue a request to the local computer 106A and to read the lock word from the local computer physical memory 102A to the remote physical memory 102B of the remote computer 106B.

FIG. 11 is a process flow of obtaining remote lock, according to one embodiment. In operation 1102, the kernel virtual address of lock of the local computer 106A may be declared the remote computer 106B. In operation 1104, the mapping 628 may be created in the remote computer virtual address space without associating any physical memory. The mapping may be associated to the local computer 106A. In operation 1106, an instruction may be executed on the remote computer 106B by a program to read the virtual address of location of lock word to result in a page fault. In operation 1108, the page fault may be identified by the page fault handler as part of extended virtual memory to issue a request to the local computer 106A and to read the lock word to the local computer memory.

In operation 1110, a request to acquire the lock on the local computer 106A may be made by a remote lock manager in the remote computer 106B to a lock manager in the local computer 106A (e.g., the lock manager may be a lock management module). In operation 1112, the availability of lock may be determined through the lock manager on the local computer 106A. If the lock is being used by other program, the request may be put in a queue by the lock manager of the local computer 106A. Furthermore, wait operation may be performed for the lock on behalf of the remote computer 106B. In operation 1114, the lock manager on the local computer 106A may be woken up to acquire the lock when available and acquisition of the lock may be informed to the lock manager of the remote computer 106B. In operation 1116, the local copy of lock word may be modified by the lock manager on the remote computer 106B and the locking operation may be completed.

FIG. 12 is a process flow illustrating lock release operation to release the lock held from the remote computer 106B, according to one embodiment. In operation 1202, status of the acquired lock may be determined from the remote computer 106B. The status may be determined to check whether the release request can be made to the lock manager on the remote computer 106B. In operation 1204, the release request may be communicated to the lock manager on the local computer 106A by the remote computer 106B using the lock manager of the remote computer 106B when the remote computer is ready to release the lock. The lock may reside in the local computer 106A. In operation 1206, the lock released may be marked by the local lock manager on the local computer 106A and the completion may be communicated to the remote computer 106B.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structures and methods may be embodied using transistors, logic gates, and electrical circuits (e.g., Application Specific Integrated (ASIC) Circuitry and/or in Digital Signal Processor (DSP) circuitry).

Particularly, the local/remote memory management module 110, the lock management module 112, translation module 218, the device control module 228, FIGS. 1-12, and the other modules may be enabled using software and/or using transistors, logic gates, and electrical circuits (e.g., application specific integrated ASIC circuitry) such as a local/remote memory management circuit, a lock management circuit, a translation circuit, a device control circuit, softwares and other circuits.

In addition, it will be appreciated that the various operations, processes, and methods disclosed herein may be embodied in a machine-readable medium and or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:
1. A method comprising:
generating a virtual address space associated with data of a local computer;
translating the virtual address space to a local physical address space with a page table entry of the local computer; and
providing a capability to extend memory space for at least one of an application and a process executing on the local computer through:
declaring, through a remote memory management module executing on a remote computer clustered with the local computer through a computer network, a set of remote kernel data structures to a local memory management module executing on the local computer; and
translating at least some of the virtual address space to a remote address of a remote memory of the remote computer through the local memory management module, thereby rendering at least a portion of a local memory of the local computer and the remote memory of the remote computer globally available to the at least one of the application and the process executing on the local computer.

2. The method of claim 1, further comprising:
communicating a piece of data to the remote memory management module according to a protocol, the piece of data being a portion of data available on the local computer, and the protocol being based on mutually negotiated agreement between the remote computer and the local computer.

3. The method of claim further comprising:
storing the piece of data on the remote computer through the remote memory management module.

4. The method of claim 2, wherein declaring the set of remote kernel data structures of the remote computer to the local memory management module further comprises:
declaring the remote kernel data structures as comprising at least one of a physical remote address and a remote virtual address to the local memory management module; and
declaring a list of free remote physical memory to the local memory management module.

5. The method of claim 4, further comprising:
mapping the remote virtual address to a local virtual address of the local computer, the remote virtual address comprising a kernel data structure.

6. The method of claim 5, further comprising:
communicating a kernel data structure lock from the remote computer to a local lock management module executing on the local computer to enable modification of the piece of data.

7. The method of claim 6, further comprising:
requesting a remote lock management module executing on the remote computer to perform an acquisition of a lock on the remote computer; and
requesting release of the lock on the remote computer based on a decision of the local computer.

8. The method of claim 4, further comprising:
creating a cache of a disk storage device in a local physical memory of the local computer;
generating an additional virtual address space associated with an additional data stored in the disk storage device; and
translating the additional virtual address space to an additional remote physical address of the remote memory through the local memory management module.

9. The method of claim 4, further comprising:
generating another virtual address space associated with a device instruction data of the local computer;
translating the another virtual address space to the local physical address space with the page table entry of the local computer;
causing a translation of the another virtual address space to the remote virtual address of the remote computer through the remote memory management module, virtual addresses being process specific and executable in at least one of a kernel mode and a user mode;

communicating the device instruction data from the local computer to the remote memory management module; and storing the device instruction data to a device control register of the remote memory.

10. A system comprising:

a local computer;

a computer network; and a remote computer clustered with the local computer through the computer network, the local computer executing a local memory management module that is configured to:

generate a virtual address space associated with data of the local computer, translate the virtual address space to a local physical address space with a page table entry of the local computer, and provide a capability to extend memory space for at least one of an application and a process executing on the local computer through translating at least some of the virtual address space to a remote address of a remote memory of the remote computer, and the remote computer executing a remote memory management module to declare a set of remote kernel data structures to the local memory management module executing on the local computer, thereby rendering at least a portion of a local memory of the local computer and the remote memory of the remote computer globally available to the at least one of the application and the process executing on the local computer.

11. The system of claim 10, wherein the local memory management module is configured to communicate a piece of data to the remote memory management module according to a protocol, the piece of data being a portion of data available on the local computer, and the protocol being based on mutually negotiated agreement between the remote computer and the local computer.

12. The system of claim 11, wherein the remote memory management module is configured to enable storage of the piece of data on the remote computer.

13. The system of claim 11, wherein the remote memory management module of the remote computer is configured to:

declare the remote kernel data structures as comprising at least one of a physical remote address and a remote virtual address to the local memory management module, and declare a list of free remote physical memory to the local memory management module.

14. The system of claim 13, further comprising:

a local lock management module executing on the local computer; and a remote lock management module executing on the remote computer to export a kernel data structure lock to the local lock management module from the local computer.

15. The system of claim 14, wherein the local lock management module is configured to:

request the remote lock management module to perform an acquisition of the kernel data structure lock on the remote computer, and request release of the kernel data structure lock on the remote computer based on a decision of the local computer.

16. The system of claim 13, wherein the local memory management module is further configured to:

create a cache of a disk storage device a local physical memory of the local computer, generate an additional virtual address space associated with additional data stored in the disk storage device, and translate the additional virtual address space to an additional remote physical address of the remote memory.

17. The system of claim 16, wherein the local memory management module is further configured to:

generate another virtual address space associated with a device instruction data of the local computer, translate the another virtual address space to the local physical address space with the page table entry of the local computer, perform a translation of the another virtual address space to the remote virtual address of the remote computer through the remote memory management module, virtual addresses being process specific and executable in at least one of a kernel mode and a user mode, communicate the device instruction data from the local computer to the remote memory management module, and enable storage of the device instruction data in a device control register of the remote memory.

18. The system of claim 17, further comprising:

a device control module executing on the local computer to provide instructions to the device control register of the remote memory.

19. A non-transitory machine-readable medium comprising instructions embodied therein configured to be executable through a local computer, comprising:

instructions for generating a virtual address space associated with data of the local computer;

instructions for translating the virtual address space to a local physical address space with a page table entry of the local computer; and instructions for providing a capability to extend memory space for at least one of an application and a process executing on the local computer through:

declaring, through a remote memory management module executing on a remote computer clustered with the local computer through a computer network, a set of remote kernel data structures to a local memory management module executing on the local computer; and translating at least some of the virtual address space to a remote address of a remote memory of the remote computer through the local memory management module, thereby rendering at least a portion of a local memory of the local computer and the remote memory of the remote computer globally available to the at least one of the application and the process executing on the local computer.

20. The non-transitory machine-readable medium of claim 19, further comprising instructions for communicating a piece of data to the remote memory management module according to a protocol, the piece of data being a portion of data available on the local computer, and the protocol being based on mutually negotiated agreement between the remote computer and the local computer.

* * * * *